US012623336B2

(12) United States Patent
Han

(10) Patent No.: US 12,623,336 B2
(45) Date of Patent: May 12, 2026

(54) WHEEL DEVICE AND MOBILE ROBOT DEVICE COMPRISING SAME

(71) Applicant: SAMSUNG ELECTRONICS CO., LTD., Suwon-si (KR)

(72) Inventor: Kyunglyong Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 448 days.

(21) Appl. No.: 18/134,903

(22) Filed: Apr. 14, 2023

(65) Prior Publication Data

US 2023/0256588 A1 Aug. 17, 2023

Related U.S. Application Data

(63) Continuation of application No. PCT/KR2021/014685, filed on Oct. 20, 2021.

(30) Foreign Application Priority Data

Nov. 25, 2020 (KR) ........................ 10-2020-0160265

(51) Int. Cl.
$$B25J\ 5/00 \quad (2006.01)$$
$$B25J\ 9/16 \quad (2006.01)$$
$$B25J\ 13/08 \quad (2006.01)$$
(52) U.S. Cl.
CPC .............. *B25J 5/007* (2013.01); *B25J 9/161* (2013.01); *B25J 9/1676* (2013.01); *B25J 13/086* (2013.01)
(58) Field of Classification Search
CPC ........ B25J 5/0007; B25J 9/0009; B25J 9/161; B25J 9/1676; B25J 13/086; B25J 19/0004;

(Continued)

(56) References Cited

U.S. PATENT DOCUMENTS

| | | | |
|---|---|---|---|
| 7,017,687 B1 | 3/2006 | Jacobsen et al. | |
| 9,045,177 B2 | 6/2015 | Chou et al. | |

(Continued)

FOREIGN PATENT DOCUMENTS

| | | |
|---|---|---|
| CN | 106427388 A | 2/2017 |
| CN | 208052991 U | 11/2018 |

(Continued)

OTHER PUBLICATIONS

Communication issued Apr. 18, 2025 by the Korean Intellectual Property Office in Korean Patent Application No. 10-2020-0160265.

(Continued)

*Primary Examiner* — Valentin Neacsu
*Assistant Examiner* — Felicia L. Brittman-Alabi
(74) *Attorney, Agent, or Firm* — Sughrue Mion, PLLC

(57) ABSTRACT

A wheel device includes: a plurality of wing members configured to rotate around a central axis, wherein each wing member of the plurality of wing members may include an outer circumferential surface and each wing member of the plurality of wing members is configured to be movable to a first position in which the respective outer circumferential surfaces combine to form a circle, and to a second position in which an end of each outer circumferential surface is rotated away from the central axis of the wheel device; a deforming device configured to move each wing member of the plurality of wing members to the first position or the second position; a plurality of rollers provided on the respective outer circumferential surfaces of the plurality of wing members, wherein each roller of the plurality of rollers has a rotation axis that is not parallel to the central axis; and a braking device including a brake pad configured to contact one or more rollers of the plurality of rollers when the plurality of wing members are in the second position and to (Continued)

1 separate from the plurality of rollers when the plurality of wing members are in the first position.

15 Claims, 7 Drawing Sheets

(58) Field of Classification Search
CPC ..... B60B 19/04; B60B 19/12; B60B 19/0004; B60B 25/02; B60B 33/02; B60B 2900/551; B62D 57/024
USPC .......................................... 180/7.1, 8.1, 8.3
See application file for complete search history.

(56) References Cited

U.S. PATENT DOCUMENTS

| | | | |
|---|---|---|---|
| 10,518,576 B1 | 12/2019 | Ebrahimi Afrouzi et al. | |
| 10,752,305 B2 | 8/2020 | Kim | |
| 2014/0158439 A1 | 6/2014 | Kim et al. | |
| 2014/0232174 A1 | 8/2014 | Zdrahal et al. | |
| 2015/0266528 A1 | 9/2015 | Matsue et al. | |
| 2022/0097450 A1 | 3/2022 | Kim et al. | |

FOREIGN PATENT DOCUMENTS

| | | | | | |
|---|---|---|---|---|---|
| JP | 5604993 B2 | 10/2014 | | | |
| KR | 10-0873723 B1 | 12/2008 | | | |
| KR | 10-2009-0103357 A | 10/2009 | | | |
| KR | 10-2016-0105212 A | 9/2016 | | | |
| KR | 20160105212 A | * | 9/2016 | .............. | B25J 11/00 |
| KR | 10-2018-0074871 A | 7/2018 | | | |
| KR | 10-2018-0089938 A | 8/2018 | | | |
| KR | 10-2020-0071481 A | 6/2020 | | | |

OTHER PUBLICATIONS

Bai, L., et al. "An optional passive/active transformable wheel-legged mobility concept for search and rescue robots", Robotics and Autonomous Systems, 107 pp. 145-155, 12 pages. [Published Sep. 1, 2018] https://www.researchgate.net/publication/325935231.

Written Opinion (PCT/ISA/237) issued from the International Searching Authority on Feb. 4, 2022 to International Application No. PCT/KR2021/014685.

International Search Report (PCT/ISA/210) issued from the International Searching Authority on Feb. 4, 2022 to International Application No. PCT/KR2021/014685.

Communication issued Dec. 19, 2025 by the Korean Ministry of Intellectual Property in Korean Patent Application No. 10-2020-0160265.

\* cited by examiner

WHEEL DEVICE AND MOBILE ROBOT DEVICE COMPRISING SAME

CROSS-REFERENCE TO RELATED APPLICATIONS

This application is a by-pass continuation of International Application No. PCT/KR2021/014685, filed on Oct. 20, 2021, which is based on and claims priority to Korean Patent Application No. 10-2020-0160265, filed on Nov. 25, 2020, in the Korean Intellectual Property Office, the disclosures of which are incorporated by reference herein in their entireties.

BACKGROUND

1. Field

The present disclosure relates to a wheel device and a mobile robot device including the same, and more particularly, to a wheel device that may be moved in all directions and easily pass an obstacle simultaneously, and a mobile robot device including the same.

2. Description of Related Art

A general wheel device may have a limitation in its movement direction or rotation direction, is unable to be easily moved to a desired position in a narrow space, and thus has a restriction on its drivability.

In addition, the wheel device may climb a stepped obstacle such as stairs through a structural change for dividing or combining the wheel device. However, sufficient frictional force may not be applied to the wheel device, and the wheel device may thus slip to have difficulty in climbing over the obstacle.

SUMMARY

Provided are a wheel device that may be moved in all directions and easily pass an obstacle simultaneously, and a mobile robot device including the same.

According to an aspect of the disclosure, a wheel device includes: a plurality of wing members configured to rotate around a central axis, wherein each wing member of the plurality of wing members may include an outer circumferential surface and each wing member of the plurality of wing members is configured to be movable to a first position in which the respective outer circumferential surfaces combine to form a circle, and to a second position in which an end of each outer circumferential surface is rotated away from the central axis of the wheel device; a deforming device configured to move each wing member of the plurality of wing members to the first position or the second position; a plurality of rollers provided on the respective outer circumferential surfaces of the plurality of wing members, wherein each roller of the plurality of rollers has a rotation axis that is not parallel to the central axis; and a braking device including a brake pad configured to contact one or more rollers of the plurality of rollers when the plurality of wing members are in the second position and to separate from the plurality of rollers when the plurality of wing members are in the first position.

The braking device may further include a support link configured to rotatably connect the brake pad to a wing member from among the plurality of wing members.

The braking device may further include a first torsion spring connecting the support link with the wing member.

The braking device may further include a braking motor configured to rotate the support link.

The brake pad may be disposed parallel to the outer circumferential surface of a wing member from among the plurality of wing members.

The brake pad may include a rubber material.

Each wing member of the plurality of wing members may further include a first point positioned at an innermost end thereof, a second point positioned between the one end of the outer circumferential surface and the first point, and a third point positioned at the other end of the outer circumferential surface, and the deforming device may include: a first spoke connecting the respective first points of the plurality of wing members with each other, a plurality of links each connecting a respective second point of a first wing member among the plurality of wing members and a third point of a second wing member among the plurality of wing member that is adjacent to the first wing member, and a second spoke connecting respective intermediate regions of the plurality of links with one another.

The deforming device may further include: a first drive motor configured to rotate the first spoke, and a second drive motor configured to rotate the second spoke.

The braking device may further include: a first braking link integrally formed with the first spoke, and a second braking link having a first end rotatably connected to a wing member among the plurality of wing members and disposed on a rotational path of the first braking link, and a second end of the second braking link is configured to press the brake pad into contact with one or more of the plurality of rollers when the second braking link is pressed and rotated by the first braking link.

The first braking link may extend from the first spoke away from the central axis.

The braking device may further include a torsion spring connecting the wing member to the first end of the second braking link.

According to an aspect of the disclosure, a mobile robot device includes: a base; and a plurality of wheel devices installed on a lower portion of the base, wherein each wheel device of the plurality of wheel devices includes: a plurality of wing members configured to rotate around a central axis, wherein each wing member of the plurality of wing members may include an outer circumferential surface and each wing member of the plurality of wing members is configured to be movable to a first position in which the respective outer circumferential surfaces combine to form a circle, and in a second position in which an end of each outer circumferential surface is rotated away from the central axis of the wheel device; a deforming device configured to move each wing member of the plurality of wing members to the first position or the second position; a plurality of rollers provided on the respective outer circumferential surfaces of the plurality of wing members, wherein each roller of the plurality of rollers has a rotation axis that is not parallel to the central axis; and a braking device including a brake pad configured to contact one or more rollers of the plurality of rollers when the plurality of wing members are in the second position and to separate from the plurality of rollers when the plurality of wing members are in the first position.

The mobile robot device may further include: an obstacle detection sensor; and at least one processor configured to: identify, based on a sensing value obtained via the obstacle detection sensor, the presence of an obstacle in front of the mobile robot device, and based on identifying the presence of the obstacle in front of the mobile robot, cause each respective deforming device to move the plurality of wing members of each wheel device of the plurality of wheel devices to the second position.

For each respective wheel device among the plurality of wheel devices, the braking device may further include a support link configured to rotatably connect the brake pad to a wing member from among the plurality of wing members.

For each respective wheel device among the plurality of wheel devices, the braking device may further include a braking motor configured to rotate the support link, and the at least one processor is further configured to, for each respective wheel device, cause the braking motor to rotate the support link away from the central axis based on the identifying the presence of the obstacle in front of the mobile robot device.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a functional block diagram showing a control process of the mobile robot device;

DETAILED DESCRIPTION

Embodiments described below are illustratively provided to assist in understanding of the present disclosure, and it is to be understood that the present disclosure may be variously modified and executed unlike the embodiments described herein. In describing the present disclosure, omitted is a detailed description of a case where it is decided that the detailed description for the known functions or components related to the present disclosure may unnecessarily obscure the gist of the present disclosure. Further, the accompanying drawings are not illustrated to scale, and sizes of some components may be exaggerated to assist in the understanding of the present disclosure.

A term used in this specification and the claims is selected in consideration of its function in the present disclosure. However, this term may be changed based on intentions of those skilled in the art to which the present disclosure pertains, legal or technical interpretations, and the emergence of new technology. In addition, some terms are arbitrarily selected by the applicant, and such terms may be interpreted to have the meaning defined in this specification; and, if there is no specific definition of the term, the term may be interpreted based on a general content of this specification and common technical knowledge in the art.

In the present disclosure, an expression "have," "may have," "include," "may include" or the like, indicates the existence of a corresponding feature (for example, a numerical value, a function, an operation or a component such as a part), and does not exclude the existence of an additional feature.

In addition, this specification describes components necessary for describing each embodiment of the present disclosure, but is not necessarily limited thereto. Accordingly, some components may be changed or omitted, and other components may be added. In addition, the components may be distributed and arranged in different independent devices.

Furthermore, the embodiments of the present disclosure are described in detail with reference to the accompanying drawings and the contents shown in the accompanying drawings, and the present disclosure is not limited or restricted to the embodiments.

Hereinafter, the present disclosure is described in more detail with reference to the accompanying drawings.

Figure 1:
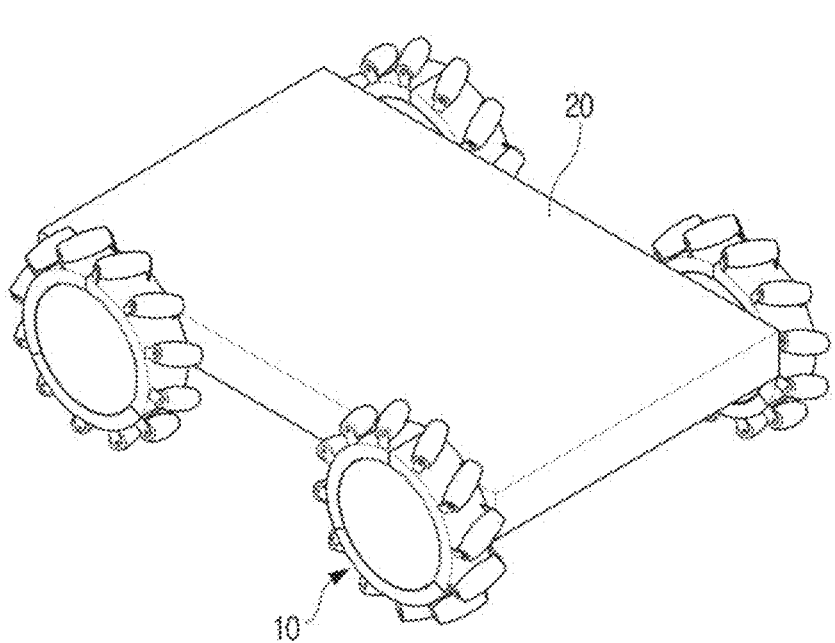
FIG. 1 is a perspective view of a mobile robot device according to an embodiment of the present disclosure.
Figure 2:
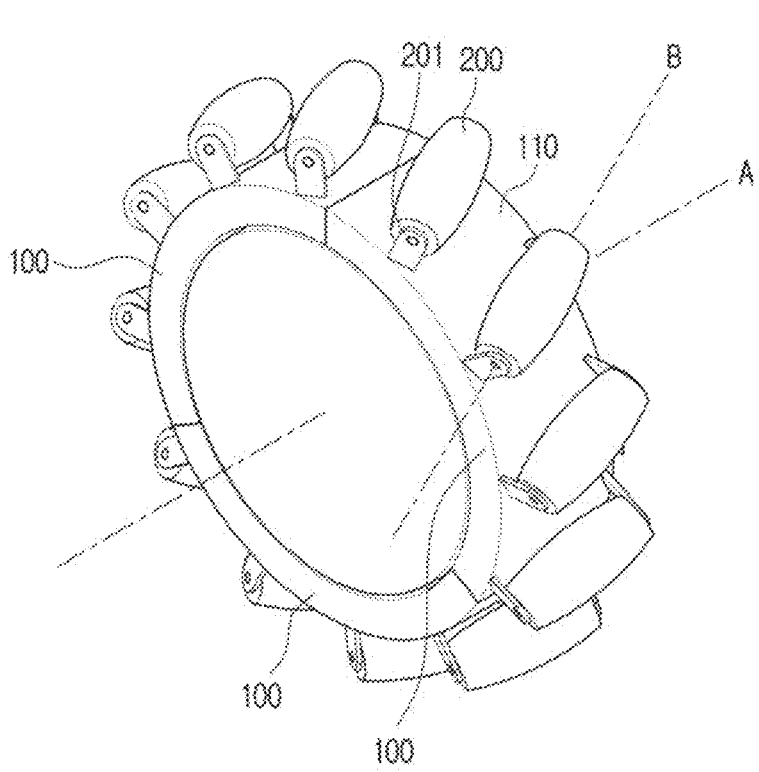
FIG. 2 is a perspective view of a wheel device according to another embodiment of the present disclosure.
Figure 3:
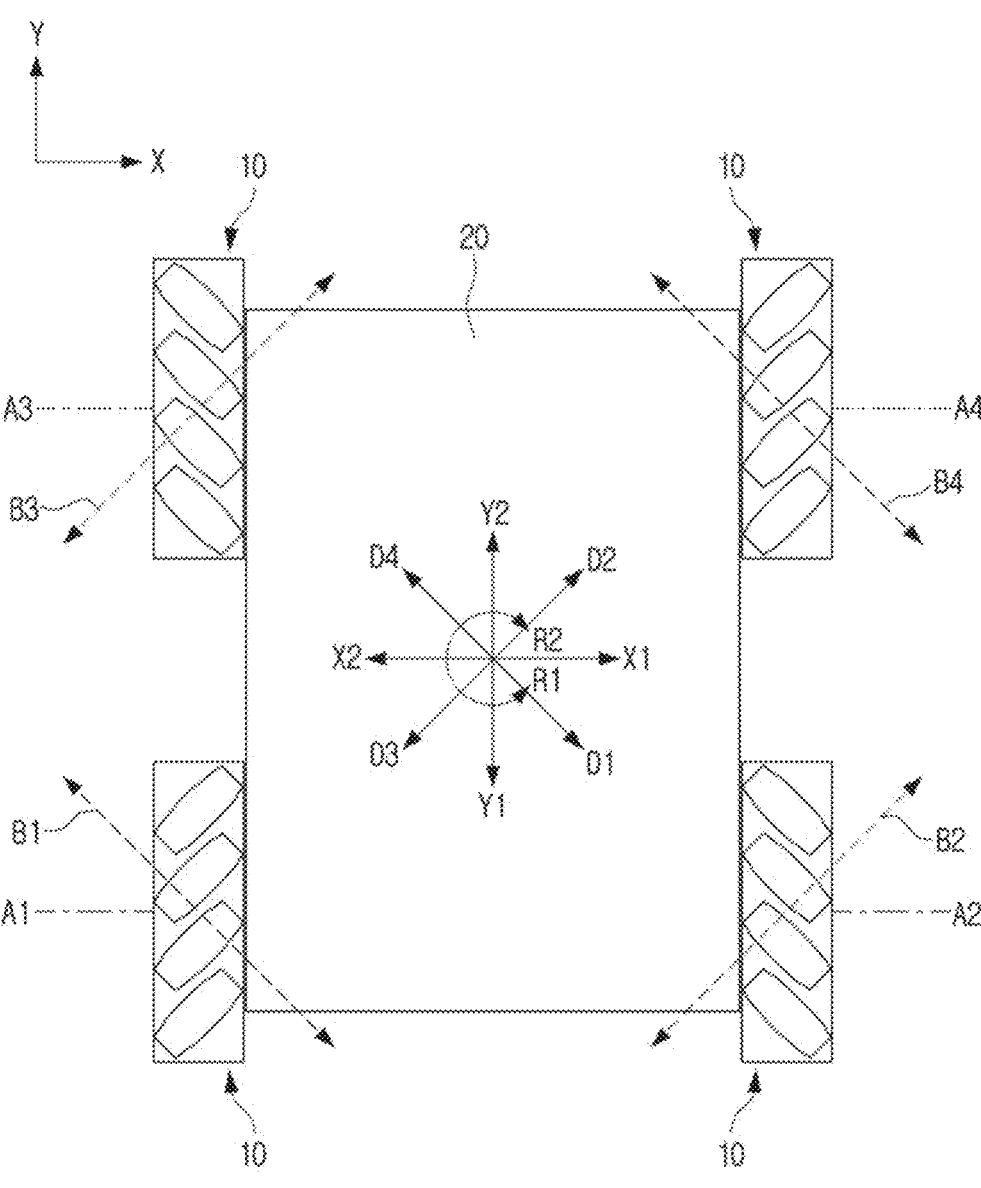
FIG. 3 is a top view schematically showing a structure of the mobile robot device.

FIG. 1 is a perspective view of a mobile robot device according to an embodiment of the present disclosure. FIG. 2 is a perspective view of a wheel device according to another embodiment of the present disclosure. FIG. 3 is a top view schematically showing a structure of the mobile robot device.

Referring to FIGS. 1 to 3, the mobile robot device according to an embodiment of the present disclosure may include at least two wheel devices 10 and a base 20.

The wheel devices 10 may be installed on a lower portion of the base 20, and two wheel devices may each be installed on the front and rear of the base 20.

The base 20 may be a part corresponding to a main body of the mobile robot device 1, have a substantially rectangular parallelepiped shape, and is not limited to this shape.

The wheel device 10 may include a plurality of wing members 100 and a plurality of rollers 200.

The wing member 100 may be rotated based on a central axis "A" of the wheel device 10. The wing member 100 may normally be in a first position in which respective outer circumferential surfaces 110 thereof are combined with each other to form a circle. The wing member 100 may be implemented as three wing members in one wheel device 10, and is not limited to this number.

The rollers 200 may be arranged on an outer circumferential surface 110 of the wing member 100 and each have a rotation axis "B" that is not parallel to the central axis "A." The rotation axis "B" of the roller 200 and the central axis "A" of the wheel device 10 may be separated from each other by 45 degrees.

Each of two ends of the roller 200 may be rotated by being supported by a support 201 installed on the outer circumferential surface 110 of the wing member 100. The roller 200 may be spaced apart from the outer circumferential surface 110 of the wing member 100 by a predetermined distance.

Frictional force may be applied to the wheel device 10 in a direction perpendicular to the rotation axis "B" of the roller 200. In detail, as shown in FIG. 3, the mobile robot device 1 having four wheel devices 10 may have frictional forces in various combinations applied thereto based on rotation directions of the respective wheel devices 10. Accordingly, the mobile robot device 1 may be moved in all directions.

For example, the mobile robot device 1 may be moved to the right in an X1 direction when the two wheel devices 10 disposed on the front left (or in a +Y direction) and rear right (or in a −Y direction) of the mobile robot device 1 are rotated forward, and the two wheel devices 10 disposed on the front right and the rear left are rotated backward.

In addition, the mobile robot device 1 may be rotated in an R2 direction when the two wheel devices 10 disposed on the front left and the rear left are rotated forward, and the two wheel devices 10 disposed on the rear left and the rear right are rotated backward.

That is, the mobile robot device 1 may be moved in all the directions based on the combination of the frictional forces acting in various directions, and thus be easily moved to a desired position even in a narrow space.

Figure 4:
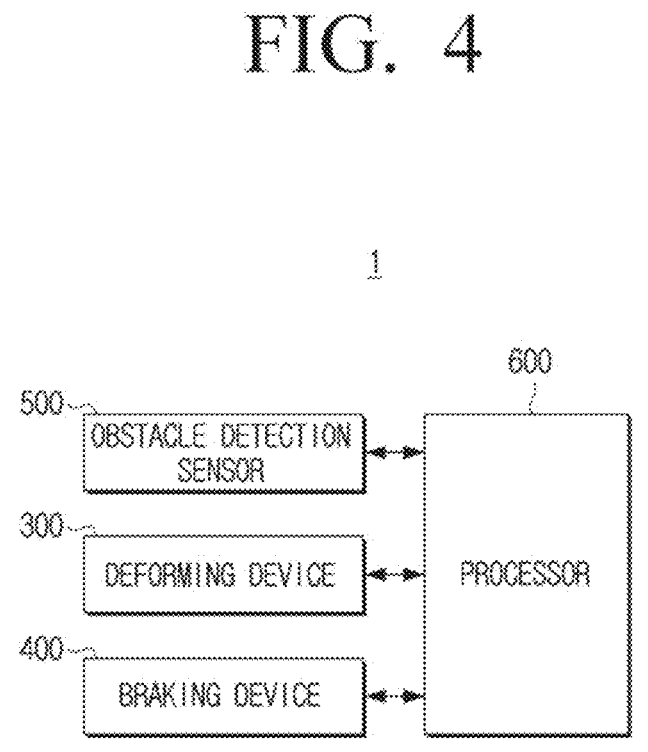
Figure 5:
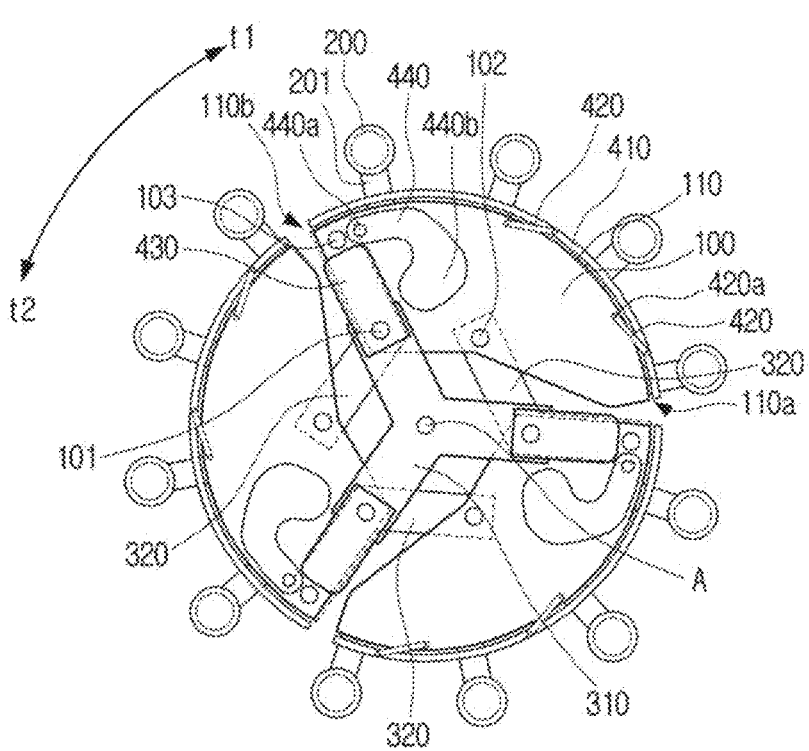
FIG. 5 is a cross-sectional view of the wheel device when wing members are in a first position.
Figure 6:
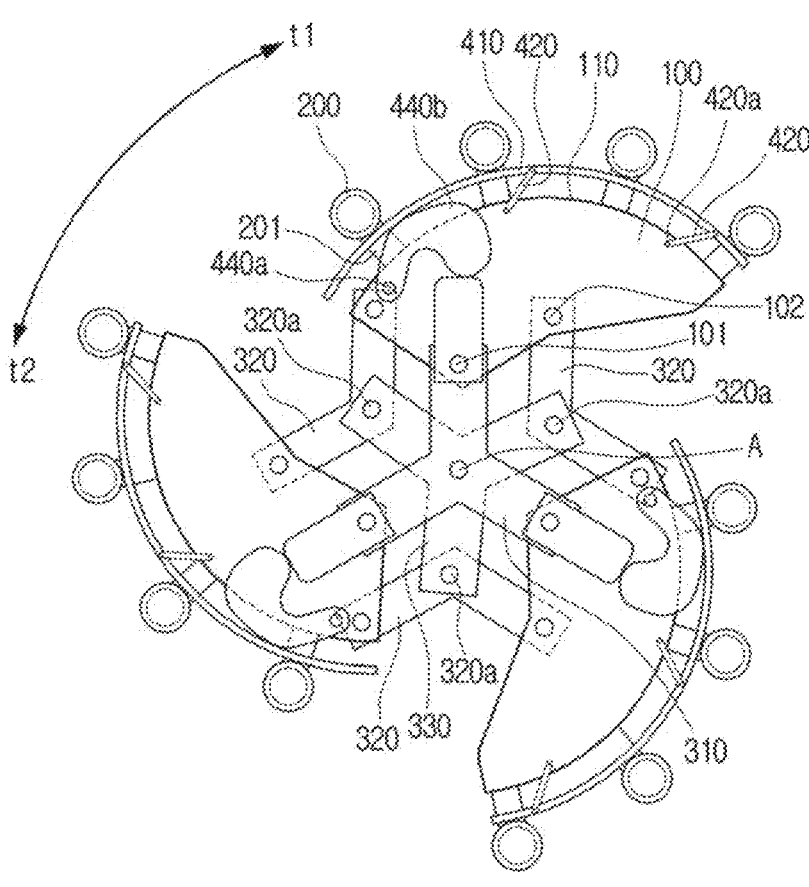
FIG. 6 is a cross-sectional view of the wheel device when the wing members are in a second position.

FIG. 4 is a functional block diagram showing a control process of the mobile robot device. FIG. 5 is a cross-sectional view of the wheel device when the wing members are in the first position. FIG. 6 is a cross-sectional view of the wheel device when the wing members are in a second position.

Referring to FIGS. 4 to 6, the mobile robot device 1 according to an embodiment of the present disclosure may further include a deforming device 300, a braking device 400, an obstacle detection sensor 500, and a processor 600.

The plurality of wing members 100 may be moved to the first position in which the respective outer circumferential surfaces 110 thereof are combined with each other to form the circle, or the second position in which one end 110a of each outer circumferential surface 110 thereof is rotated away from the central axis "A" of the wheel device 10 for the wheel members to be separated from each other. In addition, the deforming device 300 may move the plurality of wing members 100 to the first position or the second position.

Each of the plurality of wing members 100 may have a first point 101 positioned at an innermost end thereof, a second point 102 positioned between the one end 110a of the outer circumferential surface 110 and the first point 101, and a third point 103 positioned at the other end 110b of the outer circumferential surface 110.

In addition, the deforming device 300 may include a first spoke 310 connecting the respective first points 101 of the plurality of wing members 100 with each other, a plurality of links 320 each connecting the respective second points 102 of two adjacent wing members among the plurality of wing members 100 and the third point 103 of the adjacent wing member with one another, and a second spoke 330 connecting respective intermediate regions of the plurality of links 320 with one another.

The first and second spokes 310 and 330 may have the same shapes as each other. In detail, the first and second spokes 310 and 330 may all have a "Y" shape of the same size and be rotated based on the central axis "A."

The drawing shows that three links 320 are provided and each link has a "V" shape in which its middle region is bent. However, the number of links is not limited thereto, and may be the same as the number of the wing members 100.

Accordingly, when the first spoke 310 is rotated in a direction t1, the plurality of wing members 100 may each be moved to the second position by a structure of a plurality of links, i.e. four-section link structure, implemented by the first spoke 310, the second spoke 330, the link 320, and the wing member 100. When the plurality of wing members 100 are moved to the second position, the wheel device 10 may have an increased total turning radius and a blade shape to thus easily pass a stepped obstacle.

In addition, the deforming device 300 may further include a first drive motor rotating the first spoke 310, and a second drive motor rotating the second spoke 330.

The wing member 100 may be moved from the first position to the second position when the first spoke 310 is rotated in the direction t1 by the first drive motor. All the wing members 100 may then be rotated based on the central axis "A" when the second spoke 330 is rotated by the second drive motor.

Accordingly, the wing member 100 may be rotated while being in the second position, and the wheel device 10 may thus easily pass the stepped obstacle.

The braking device 400 may include a brake pad 410 in selective contact with the roller 200, and limit rotation of the roller 200 by separating the brake pad 410 from the roller 200 when the wing member 100 is in the first position and moving the brake pad 410 to come into contact with the roller 200 when the wing member 100 is in the second position.

Accordingly, the roller 200 may not be rotated using the braking device 400 when the mobile robot device 1 passes the obstacle while the wing member 100 is in the second position. It is thus possible to prevent a slip phenomenon in which each roller slips due to the obstacle, and apply sufficient frictional force to the mobile robot device 1, thus making it easier for the mobile robot device 1 to pass the obstacle.

The braking device 400 may further include a support link 420 allowing the brake pad 410 to be rotatably connected to the wing member 100. In addition, the braking device 400 may include braking motor rotating the support link 420. Accordingly, the brake pad 410 may be in selective contact with or spaced apart from the roller 200 as the braking motor rotates the support link 420.

The brake pad 410 may be made of a rubber material. Accordingly, the roller 200 may be provided with the sufficiently large frictional force and thus be easily stopped. The brake pad 410 may be disposed parallel to the outer circumferential surface 110 of the wing member 100, and thus be in contact with all the rollers 200.

The braking device 400 may include a first braking link 430 integrally formed with the first spoke 310, and a second braking link 440 having one end rotatably connected to the wing member 100 and disposed on a rotational path of the first braking link 430, in which the other end of the second braking link 440 presses the brake pad 410 into contact with the roller 200 when the second braking link 440 is pressed and rotated by the first braking link 430.

The first braking link 430 may be formed by extending a portion of the first spoke 310 to be away from the central axis "A."

In detail, the first braking link 430 integrally formed with the first spoke 310 may also be rotated in the direction t1 when the first spoke 310 is rotated in the t1 direction. Simultaneously, the second braking link 440 may be rotated in a direction t2 because the first braking link 430 presses the other end 440b of the second braking link 440.

Meanwhile, the other end 440b of the second braking link 440 may be engaged with the first braking link 430. For example, the other end 440b of the second braking link 440 may have one side facing the first braking link 430 and concavely inserted thereinto.

An outer region of the second braking link 440 may press the brake pad 410 to be away from the central axis "A" when the second braking link 440 is rotated around one end 440a in the direction t2.

Accordingly, the brake pad 410 may be rotated to be away from the central axis "A" while being supported by the support link 420, and thus come into contact with the roller 200. That is, the rotation of the roller 200 may be limited because the wing member 100 is moved from the first position to the second position as the first spoke 310 is rotated, and simultaneously, the brake pad 410 is disposed to be in contact with the roller 200.

In addition, the braking device 400 may further include a first torsion spring connecting the support link 420 with the wing member 100 and a second torsion spring connecting the wing member 100 with one end of the second braking link 440. Accordingly, the support link 420 and the second braking link 440 may return to their initial positions when no external force is applied thereto.

In detail, the first braking link 430 integrally formed with the first spoke 310 may also be rotated in the direction t2 when the first spoke 310 is rotated in the direction t2. Simultaneously, the second braking link 440 may have no interference by the first braking link 430, and thus be rotated in the direction t1 by the second torsion spring to return to its original position. The brake pad 410 may also have no interference by the second braking link 440, and thus be rotated in the direction t1 by the first torsion spring to be spaced apart from the roller 200.

The obstacle detection sensor 500 may detect the obstacle around the mobile robot device 1. The obstacle detection sensor 500 may be a camera capturing an image of a surrounding environment of the mobile robot device 1, and its type is not limited thereto.

The processor 600 may control overall operations of the mobile robot device 1. To this end, the processor may include one or more of a central processing unit (CPU), an application processor (AP), and a communication processor (CP). The processor may be a microcontroller (or micro control unit, MCU).

The processor 600 may drive an operating system or an application program to control hardware or software components connected to the processor 600, and perform various kinds of data processing and calculations. In addition, the processor 600 may load and process instructions or data received from at least one of other components in the volatile memory, and store various data in the non-volatile memory.

The processor 600 may control the deforming device 300 to move the wing member 100 to the second position when determining that the obstacle exists in front of the mobile robot device 1 based on a sensing value detected by the obstacle detection sensor 500.

In addition, the processor 600 may control the braking motor to rotate the support link 420 to be away from the central axis "A" when determining that the obstacle exists in front of the mobile robot device 1 based on the sensing value detected by the obstacle detection sensor 500.

Figure 7:
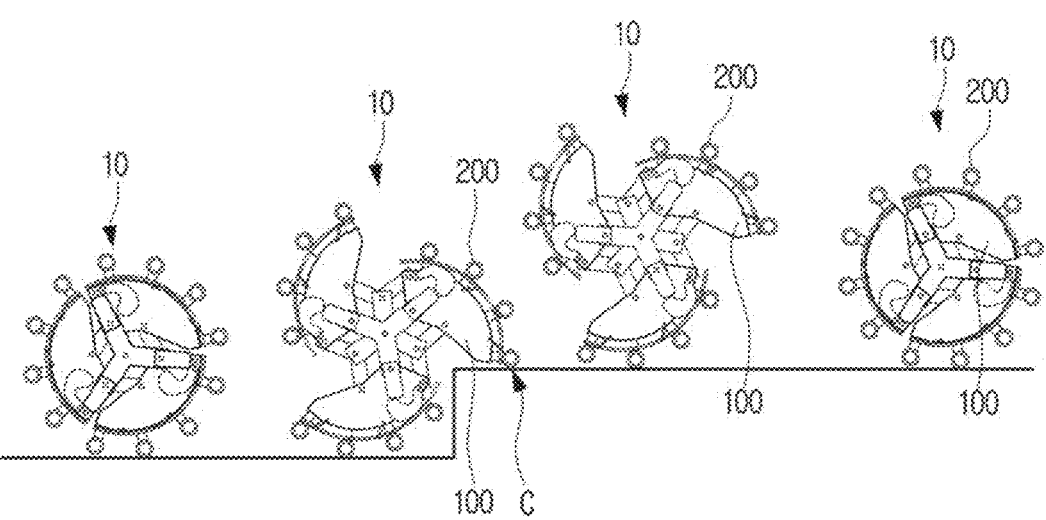
FIG. 7 is a view schematically showing a process in which the wheel device passes an obstacle.

FIG. 7 is a view schematically showing a process in which the wheel device passes the obstacle.

Referring to FIG. 7, the processor 600 may control the deforming device 300 to move the plurality of wing members 100 from the first position to the second position when determining that the obstacle exists in front of the mobile robot device 1 based on the sensing value detected by the obstacle detection sensor 500.

In detail, the wing member 100 of the wheel device 10 may normally be in the first position, be moved to the second position in front of the obstacle, pass the obstacle in that state, and return to the first position after completely passing the obstacle.

When the braking device 400 is implemented as the first and second braking links 430 and 440, the first and second braking links 430 and 440 may be rotated simultaneously as the first spoke 310 is rotated, and the brake pad 410 may thus come into contact with the roller 200. In this case, the processor 600 may limit the rotation of the roller 200 by only using the above-described link structure with no need for a separate control operation.

In addition, when the braking device 400 includes the braking motor rotating the support link 420 of the brake pad 410, the braking motor may rotate the support link 420 simultaneously as the first spoke 310 is rotated, and the brake pad 410 may come into contact with the roller 200 to thus limit the rotation of the roller 200.

Here, the processor 600 may control the braking motor to rotate the support link 420 to be away from the central axis "A" when determining that the obstacle exists in front of the mobile robot device 1 based on the sensing value detected by the obstacle detection sensor 500.

The wheel device 10 may pass the obstacle as the second spoke 330 is rotated after the wing member 100 of the wheel device 10 is moved and deformed to the second position in front of the obstacle. Here, the rotation of the roller 200 in contact with an upper region of the obstacle may be limited by the brake pad 410, and the roller may thus receive the sufficiently large frictional force at a ground-contact point C with no idling. Accordingly, the wheel device 10 may easily pass the obstacle.

After all the wheel devices 10 pass the obstacle, the wing member 100 may return to its initial shape by being moved from the second position to the first position.

Although certain embodiments of the present disclosure have been shown and described, the present disclosure is not limited to the above-mentioned embodiments, and may be variously modified by those skilled in the art to which the present disclosure pertains without departing from the gist of the present disclosure as claimed in the accompanying claims. These modifications should also be understood to fall within the scope of the present disclosure as claimed the following claims.

What is claimed is:

1. A wheel device comprising:
a plurality of wing members configured to rotate around a central axis, wherein each wing member of the plurality of wing members comprises an outer circumferential surface and each wing member of the plurality of wing members is configured to be movable to a first position in which the respective outer circumferential surfaces combine to form a circle, and to a second position in which each outer circumferential surface is rotated away from the central axis of the wheel device;
a deforming device configured to move each wing member of the plurality of wing members to the first position or the second position;
a plurality of rollers provided on the respective outer circumferential surfaces of the plurality of wing members, wherein each roller of the plurality of rollers has a rotation axis that is not parallel to the central axis; and
a braking device comprising a brake pad configured to contact one or more rollers of the plurality of rollers when the plurality of wing members are in the second position and to separate from the plurality of rollers when the plurality of wing members are in the first position.

2. The wheel device of claim 1, wherein the braking device further comprises a support link configured to rotatably connect the brake pad to a wing member from among the plurality of wing members.

3. The wheel device of claim 2, wherein the braking device further comprises a first torsion spring connecting the support link with the wing member.

4. The wheel device of claim 2, wherein the braking device further comprises a braking motor configured to rotate the support link.

5. The wheel device of claim 1, wherein the brake pad is disposed parallel to the outer circumferential surface of a wing member from among the plurality of wing members.

6. The wheel device of claim 1, wherein the brake pad comprises a rubber material.

7. The wheel device of claim 1, wherein each wing member of the plurality of wing members further comprises a first point positioned at an innermost end thereof, a second point positioned between one end of the outer circumferential surface and the first point, and a third point positioned at another end of the outer circumferential surface, and wherein the deforming device comprises:

a first spoke connecting the respective first points of the plurality of wing members with each other;

a plurality of links each connecting the respective second point of a first wing member among the plurality of wing members and the third point of a second wing member among the plurality of wing members that is adjacent to the first wing member; and a second spoke connecting respective intermediate regions of the plurality of links with one another.

8. The wheel device of claim 7, wherein the deforming device further comprises:

a first drive motor configured to rotate the first spoke; and a second drive motor configured to rotate the second spoke.

9. The wheel device of claim 7, wherein the braking device further comprises:

a first braking link integrally formed with the first spoke; and a second braking link having a first end rotatably connected to a wing member among the plurality of wing members and disposed on a rotational path of the first braking link, and wherein a second end of the second braking link is configured to press the brake pad into contact with one or more of the plurality of rollers when the second braking link is pressed and rotated by the first braking link.

10. The wheel device of claim 9, wherein the first braking link extends from the first spoke away from the central axis.

11. The wheel device of claim 9, wherein the braking device further comprises a torsion spring connecting the wing member among the plurality of wing members to the first end of the second braking link.

12. A mobile robot device comprising:

a base; and a plurality of wheel devices installed on a lower portion of the base, wherein each wheel device of the plurality of wheel devices comprises:

a plurality of wing members configured to rotate around a central axis, wherein each wing member of the plurality of wing members comprises an outer circumferential surface and each wing member of the plurality of wing members is configured to be movable to a first position in which the respective outer circumferential surfaces combine to form a circle, and in a second position in which each outer circumferential surface is rotated away from the central axis of the wheel device;

a deforming device configured to move each wing member of the plurality of wing members to the first position or the second position;

a plurality of rollers provided on the respective outer circumferential surfaces of the plurality of wing members, wherein each roller of the plurality of rollers has a rotation axis that is not parallel to the central axis; and a braking device comprising a brake pad configured to contact one or more rollers of the plurality of rollers when the plurality of wing members are in the second position and to separate from the plurality of rollers when the plurality of wing members are in the first position.

13. The mobile robot device of claim 12, further comprising:

an obstacle detection sensor; and at least one processor configured to:

identify, based on a sensing value obtained via the obstacle detection sensor, a presence of an obstacle in front of the mobile robot device, and based on identifying the presence of the obstacle in front of the mobile robot device, cause each respective deforming device to move the plurality of wing members of each wheel device of the plurality of wheel devices to the second position.

14. The mobile robot device of claim 13, wherein for each respective wheel device among the plurality of wheel devices, the braking device further comprises a support link configured to rotatably connect the brake pad to a wing member from among the plurality of wing members.

15. The mobile robot device of claim 14, wherein for each respective wheel device among the plurality of wheel devices, the braking device further comprises a braking motor configured to rotate the support link, and wherein the at least one processor is further configured to, for each respective wheel device among the plurality of wheel devices, cause the braking motor to rotate the support link away from the central axis based on the identifying the presence of the obstacle in front of the mobile robot device.

* * * * *